US008683569B1

(12) United States Patent
Lam et al.

(10) Patent No.: US 8,683,569 B1
(45) Date of Patent: *Mar. 25, 2014

(54) APPLICATION ACCESS CONTROL SYSTEM

(75) Inventors: Josiah Lam, Kwun Tong (HK); Mark D. McGovern, Toms River, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 246 days.

This patent is subject to a terminal disclaimer.

(21) Appl. No.: 13/348,137

(22) Filed: Jan. 11, 2012

Related U.S. Application Data

(63) Continuation of application No. 11/559,081, filed on Nov. 13, 2006, now Pat. No. 8,104,076.

(51) Int. Cl.
*H04L 29/06* (2006.01)
(52) U.S. Cl.
USPC .................................. 726/8; 726/3; 713/182
(58) Field of Classification Search
USPC ............................................................ 726/8
See application file for complete search history.

(56) References Cited

U.S. PATENT DOCUMENTS

| | | | | |
|---|---|---|---|---|
| 4,652,990 A | * | 3/1987 | Pailen et al. ..................... | 705/56 |
| 5,684,950 A | * | 11/1997 | Dare et al. ....................... | 726/10 |
| 6,271,844 B1 | * | 8/2001 | Selles ............................ | 715/853 |
| 6,826,696 B1 | * | 11/2004 | Chawla et al. ..................... | 726/4 |
| 6,910,064 B1 | * | 6/2005 | Astarabadi et al. ........... | 709/203 |

OTHER PUBLICATIONS

Main, A., and P. C. van Oorschot. "Software Protection and Application Security: Understanding the Battleground." Dec. 31, 2003. State of the Art and Evolution of Computer Security and Industrial Cryptography, Jun. 2003, Heverlee, Belgium, Springer-Verlag LNCS.*

* cited by examiner

*Primary Examiner* — Taghi Arani
*Assistant Examiner* — Narciso Victoria
(74) *Attorney, Agent, or Firm* — Hunton & Williams LLP

(57) ABSTRACT

A system for application access control is disclosed. First, a business coordinator needs to register a user developed tool (UDT) containing an application to be protected with the system via a software program. After registration, a random encrypted password is generated by the application access control server and stored in its back-end database as well as a local break-glass database corresponding to the UDT. When an entitled user accesses the application in the registered UDT later on, the system will check whether he/she is entitled to access the requested application. If yes, the system will retrieve the encrypted password for that application and thus launch the application.

12 Claims, 13 Drawing Sheets

100 Application Access Control System

APPLICATION ACCESS CONTROL SYSTEM

This application is a continuation (CON) of U.S. patent application Ser. No. 11/559,081, filed Nov. 13, 2006, the disclosure of which is hereby incorporated by reference in its entirety.

FIELD OF THE INVENTION

The present invention relates to a security sub-system in a computer system of an institution which controls a user's access rights to an application via a configured mechanism whenever a user accesses the application and thus ensures that the application is accessed by an authorized user.

BACKGROUND OF THE INVENTION

In a large institution, there are hundreds of applications such as databases created, shared, and accessed by users from different departments of the institution on a daily basis. How to ensure safety of these documents, that is. to ensure that each user is limited to only necessary and sufficient access to the institution's information to perform his/her business role effectively, presents a challenge.

Currently, Microsoft Office Suite products. such as Word, Excel. Power Point, Access. and Visio, have no systematic way to externally authenticate users. This leaves a large security gap within the institution. In addition, although Microsoft Office Suite products have limited security options that require every user to use a password to open the file. .lack of the effective management of these passwords and avoidance of password sharing poses some serious security risks.

Therefore, there is a need to design a centralized and scalable mechanism to secure these applications so that they are accessed by authorized users.

SUMMARY OF THE INVENTION

This invention is generally directed to a system and a method for an internal user's obtaining authorization of accessing some applications such as databases in the forms of Microsoft Excel or Access spreadsheets maintained in an institution's computer system, via creating a randomly-generated and encrypted password with a configured mechanism by the application access control server, so that unauthorized access of the applications is restricted, their proper usage is controlled, and thus safety of the applications is ensured. A user, therefore. can use the existing user account to access the protected application without new passwords.

As an internal user, his/her rights to access appropriate levels and parts of information stored or existing in an institution's computer system based on the user's functional roles with the institution are assigned via the institution's request and approval process with periodic re-certification procedures. When the user wants to access some applications, he/she cannot access the applications directly because he/she does not have the passwords to these applications. He/she will first log into an application launcher with his/her single sign-on ID and password (SSO). which is used to login many systems for general purpose. The launcher will check the user's SSO against the application's entitled user list to decide whether he/she is authorized to use this application. If yes, the system will retrieve the random-generated password from a secure store in a configured mechanism and use it to help the user to launch the application. If not. the user is declined to access the application. This random password will not disclose to the user.

The invention provides additional protection of the applications. If someone stole the applications or sent them to someone outside the institution via an email, the recipient cannot open them because both sides do not know the real passwords of the applications.

The above and other objects and features of the present invention will be apparent in the following detailed description of the present invention when read in conjunction with the accompanying drawings.

BRIEF DESCRIPTION OF THE DRAWINGS

In order to facilitate a fuller understanding of the present invention, reference is now made to the accompanying drawings. These drawings should not be construed as limiting the present disclosure, but are intended to be exemplary only.

FIG. 5 is a diagram illustrating how to upload a namespace of an application by an application administrator in accordance with one embodiment of the present invention.

FIG. 12 is a diagram illustrating how to select access levels for MS Excel UDT in accordance with one embodiment of the present invention.

FIG. 13 is a diagram illustrating how to select access levels for MS Access UDT in accordance with one embodiment of the present invention.

DETAILED DESCRIPTION OF THE INVENTION

Figure 1:
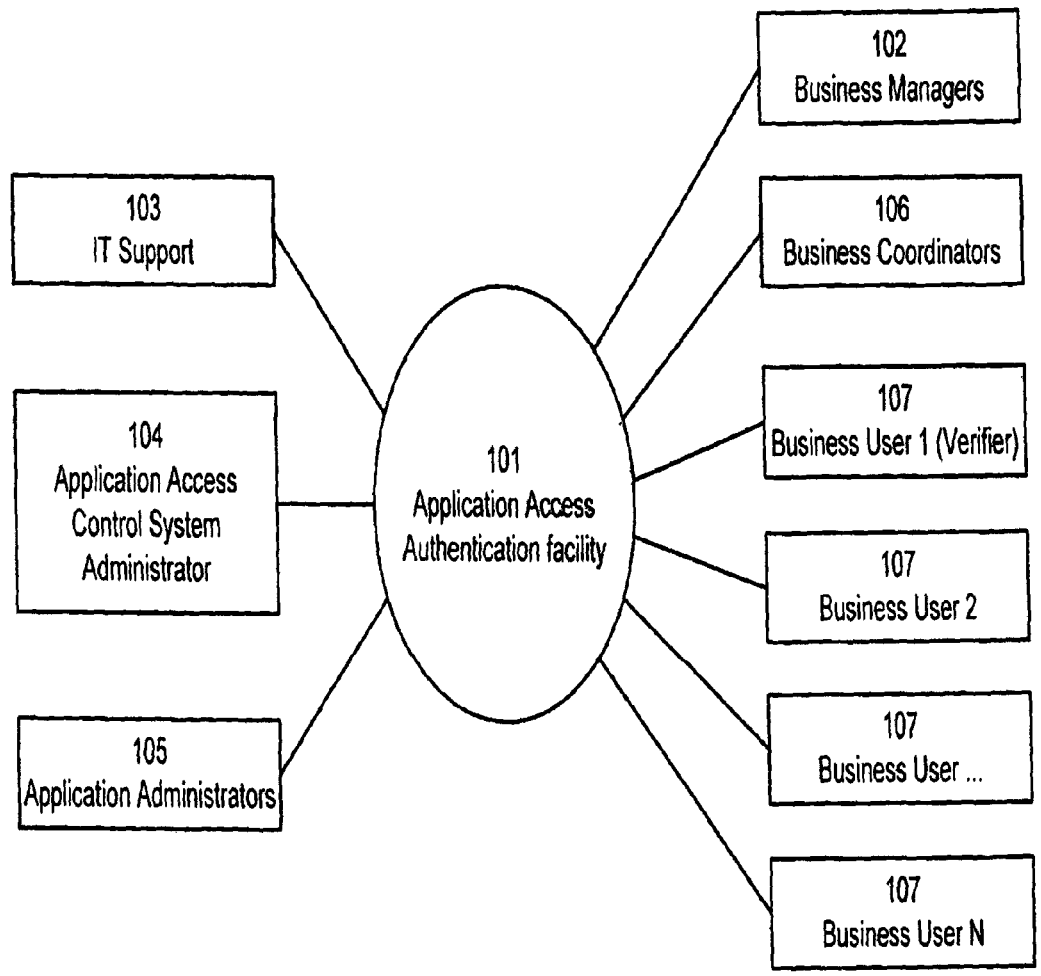
FIG. 1 is a block diagram illustrating an Application Access Control System in accordance with one embodiment of the present invention.
Figure 2:
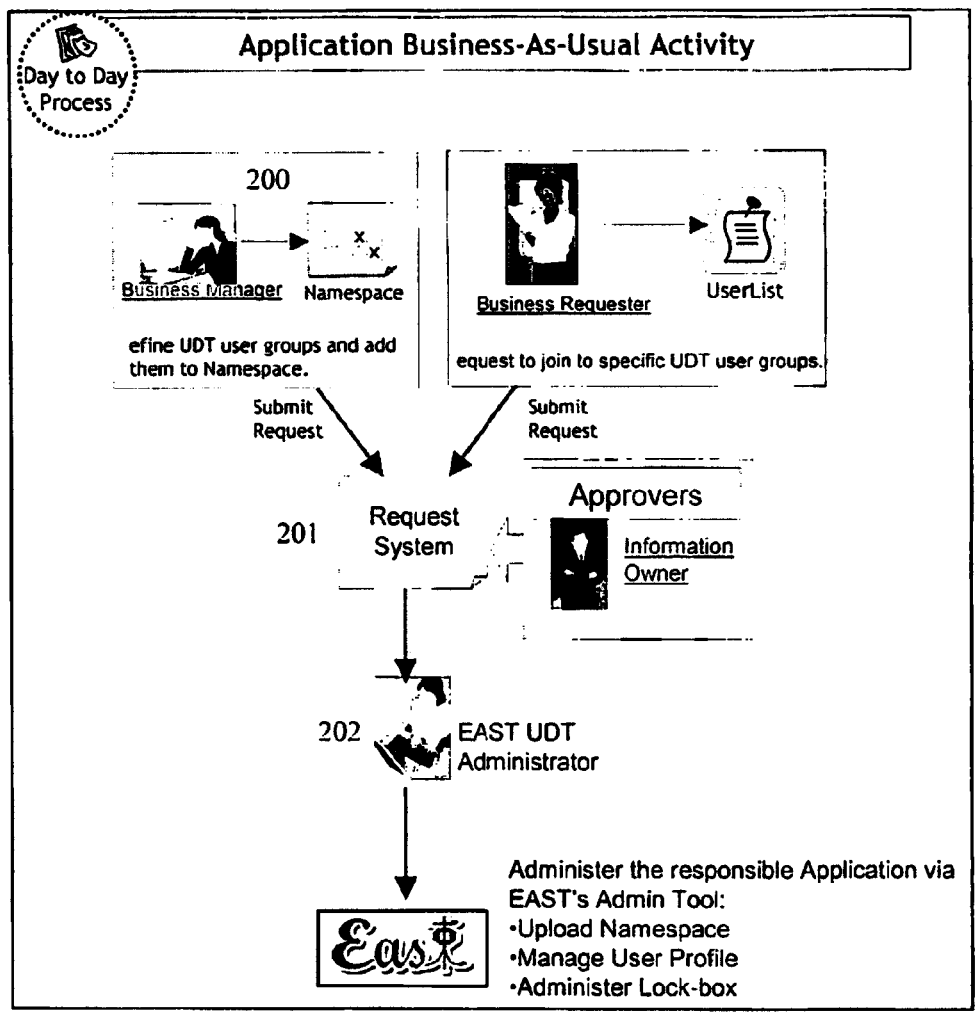
FIG. 2 is a diagram illustrating, part of a day-to-day application access certification process in accordance with one embodiment of the present invention.

FIG. 1 is a block diagram illustrating an Application Access Control System (hereafter also called "EAST") 100 in accordance with one embodiment of the present invention. FIG. 2 is a diagram illustrating part of a day-to-day application access administration process in accordance with one embodiment of the present invention.

Figure 3:
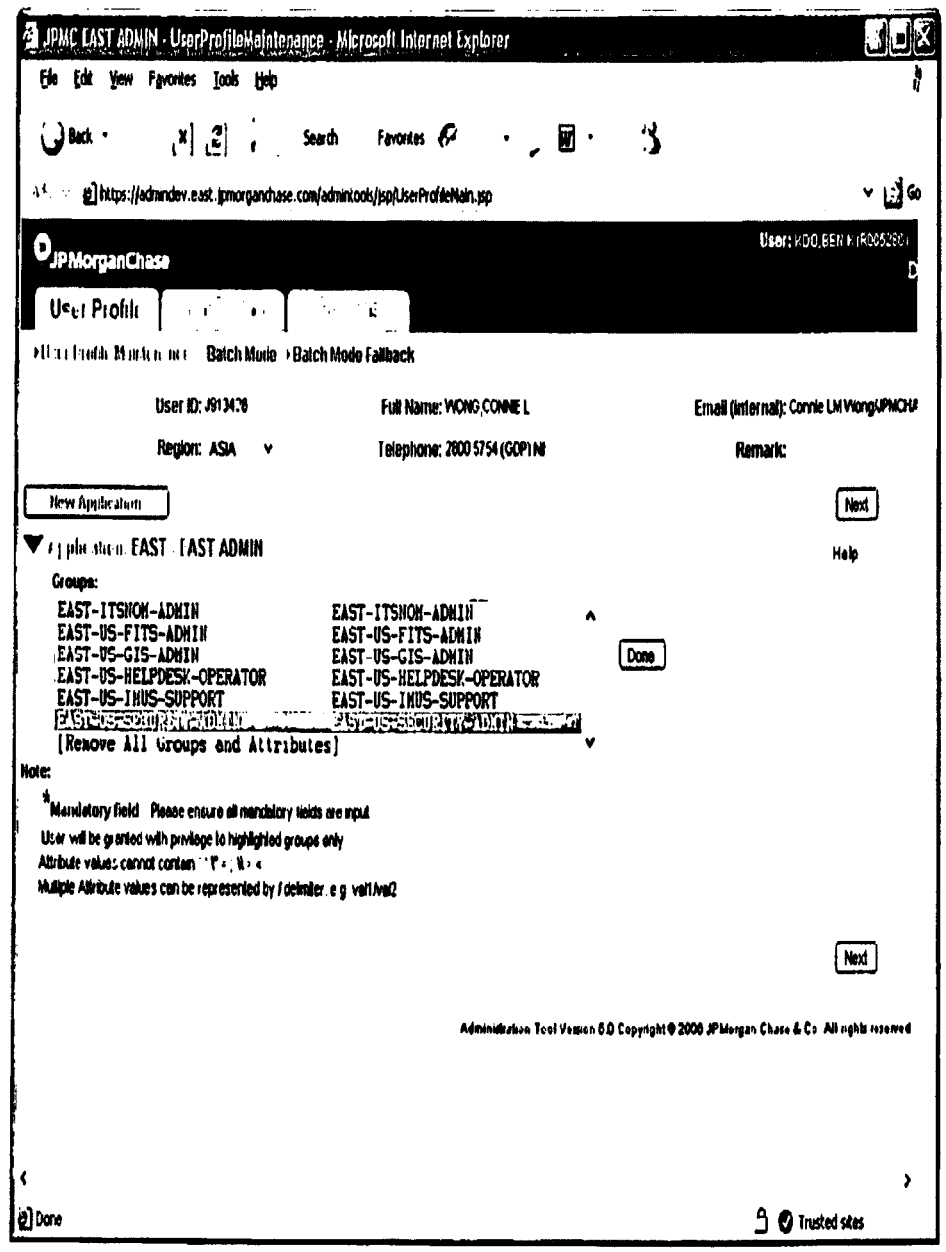
FIG. 3 is a diagram illustrating how to join all application administrators to a privilege group called "EAST-UDT-ADMINISTRATOR" in accordance with one embodiment of the present invention.
Figure 4:
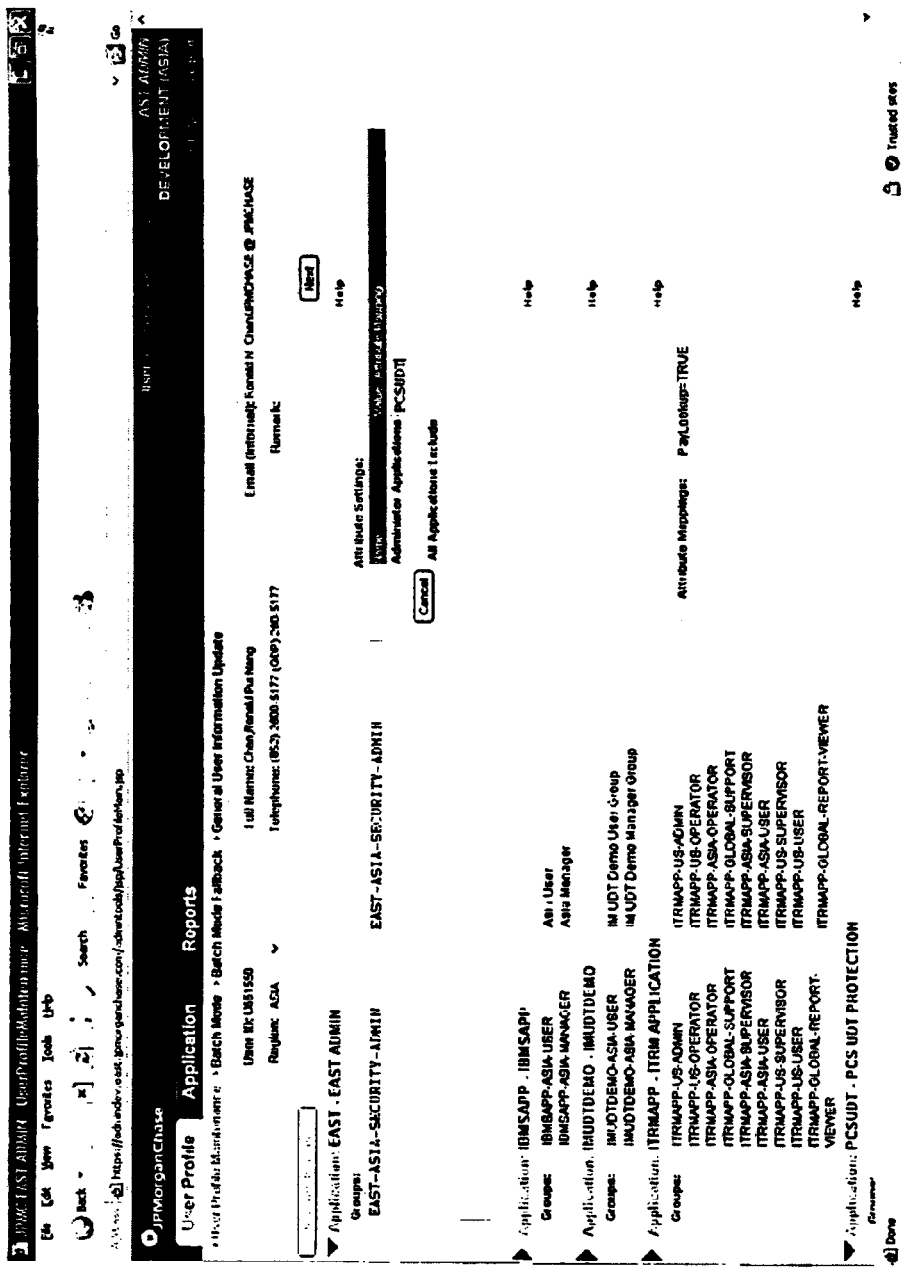
FIG. 4 is a diagram illustrating how to delegate administration of an application to an application administrator in accordance with one embodiment of the present invention.
Figure 5:
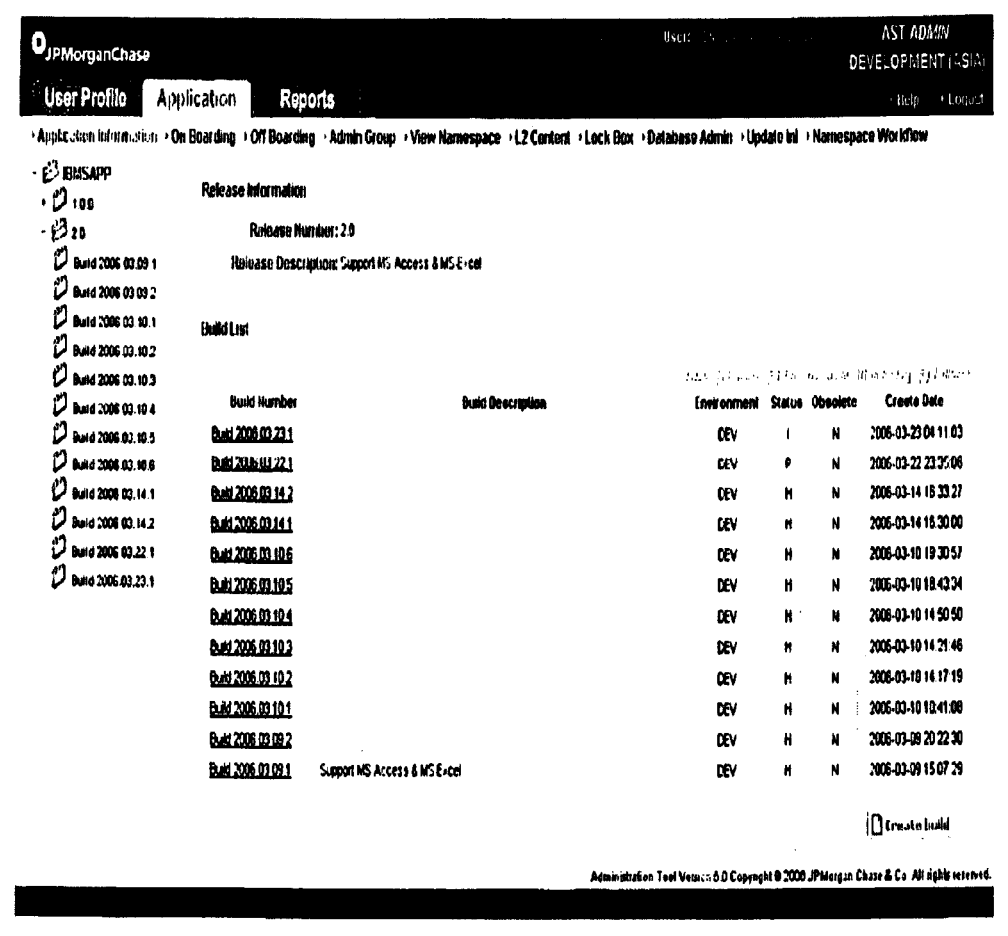
Figure 6:
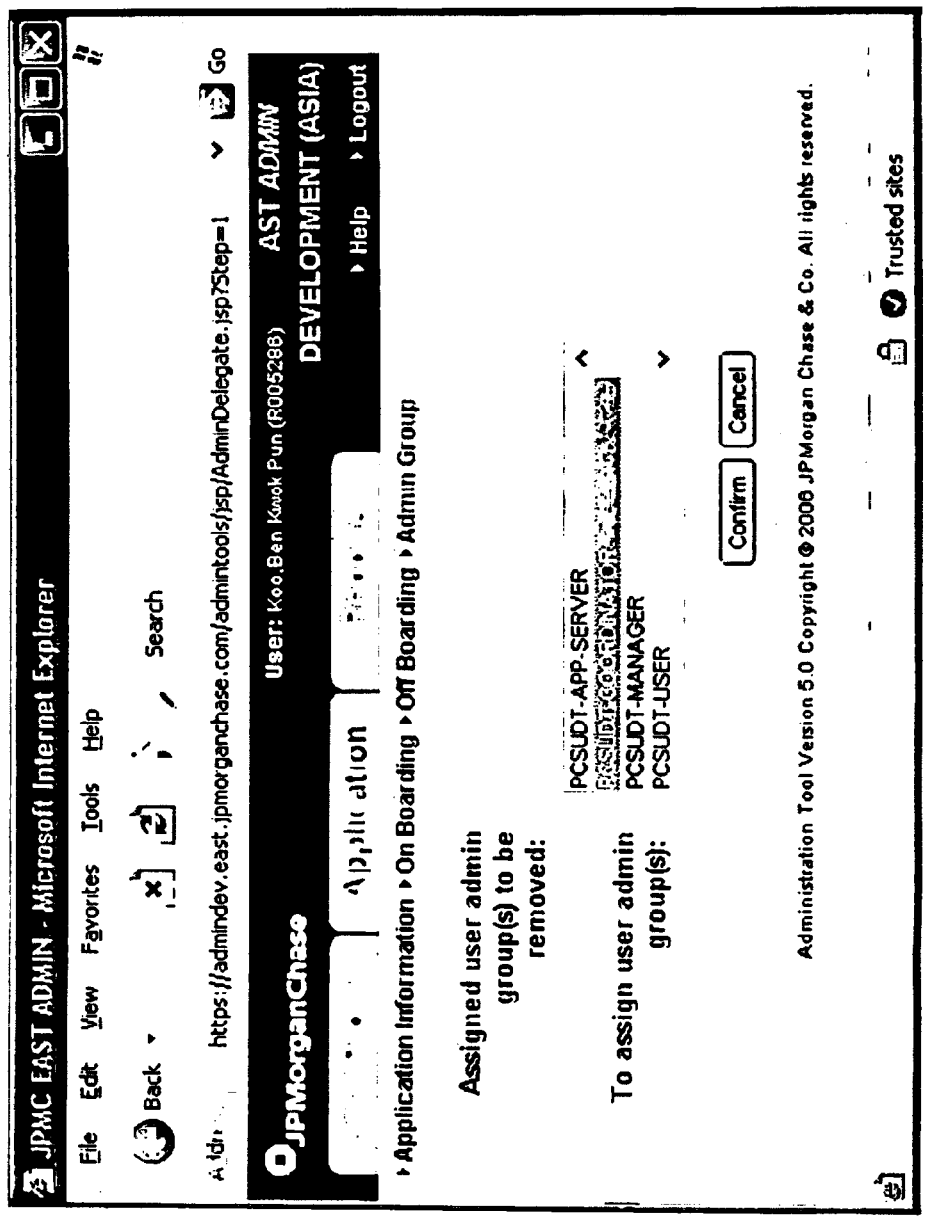
FIG. 6 is a diagram illustrating how to assign a coordinator group as a user administration group in accordance with one embodiment of the present invention.
Figure 7:
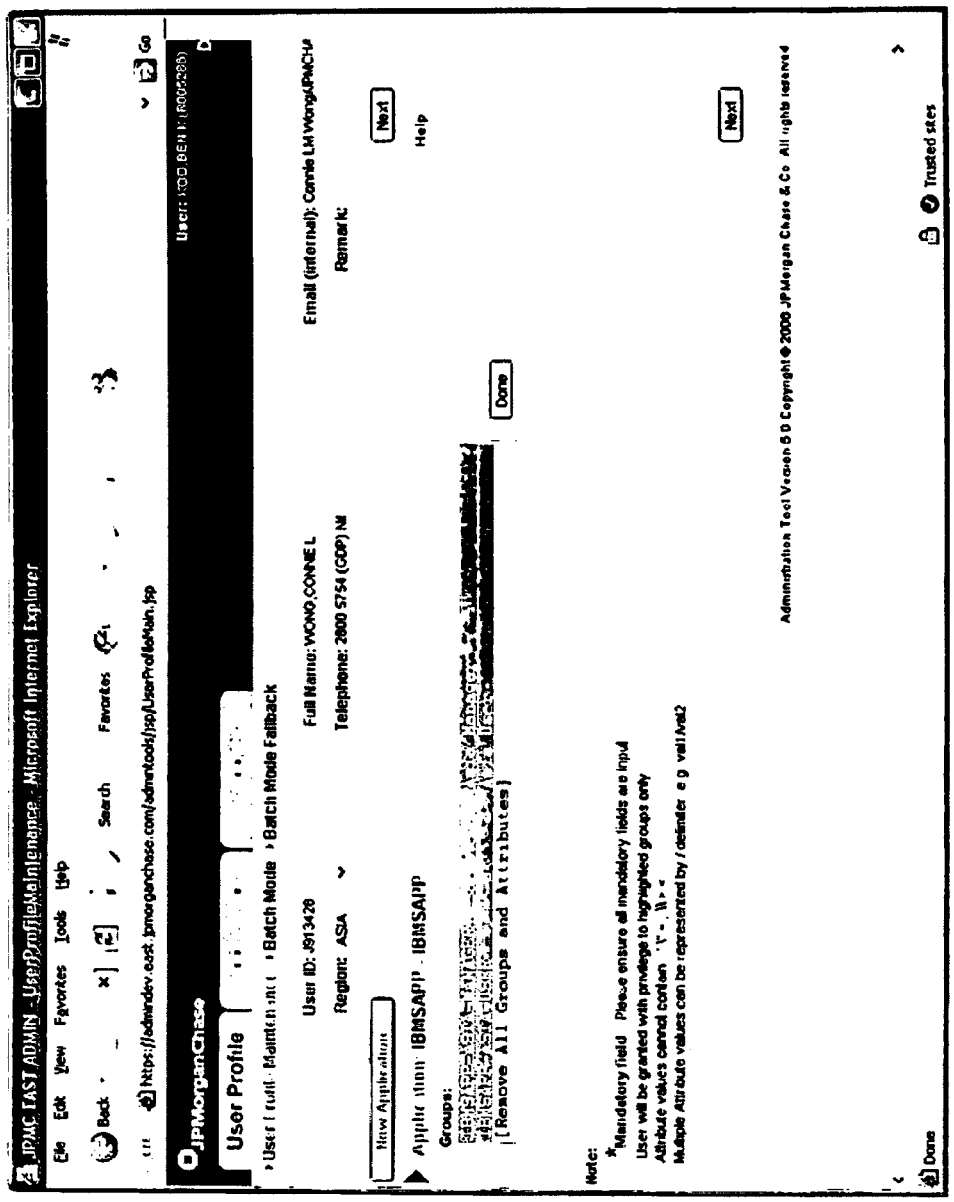
FIG. 7 is a diagram illustrating how to join business coordinators to a coordinator group in accordance with one embodiment of the present invention.
Figure 8:
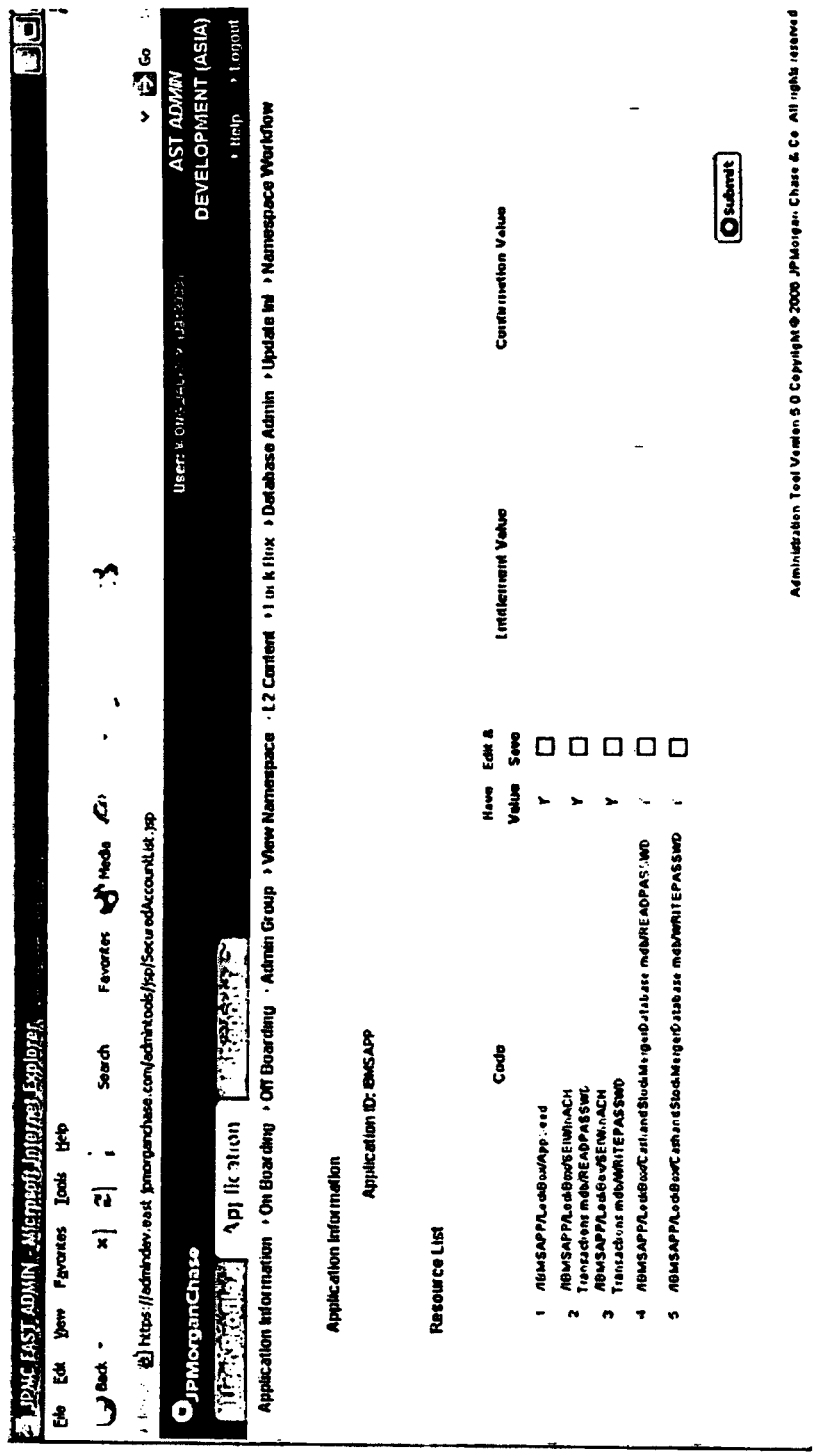
FIG. 8 is a diagram illustrating how to set up two lockbox values in accordance with one embodiment of the present invention.

FIG. 3 is a diagram illustrating how to join all application administrators to a privilege group called "EAST-UDT-ADMINISTRATOR" in accordance with one embodiment of the present invention. FIG. 4 is a diagram illustrating how to delegate administration of an application to an application administrator in accordance with one embodiment of the present invention. FIG. 5 is a diagram illustrating how to upload a namespace (access control matrix) of an application by an application administrator in accordance with one embodiment of the present invention. FIG. 6 is a diagram illustrating how to assign a coordinator group as a user administration group in accordance with one embodiment of the present invention. FIG. 7 is a diagram illustrating how to join business coordinators to a coordinator group in accordance with one embodiment of the present invention. FIG. 8 is a diagram illustrating how to set up two lockbox values in accordance with one embodiment of the present invention. FIG. 1 is described in connection with FIGS. 2-8 in order to set forth description of the system in a concrete fashion easily understood by the person of ordinary skills.

As set forth in FIG. 1, the Application Access Control System comprises an application access authentication facility 101, business managers 102, a computer system (IT) support 103, an application access control system administrator 104, application administrators 105, business coordinators 106, and business users 107. The application access authentication facility is an engine which controls the application access authentication process. The business managers are persons who submit requests for on-boarding new applications (also 200 as shown in FIG. 2). The requests include information such as the applications' owners. user groups, users in each group, business coordinators, and application administrators. The IT support is an IT staff who assigns identification numbers (IDs) to the requested new applications, loads the applications to the application access control server. prepares a namespace (access control matrix) for a user developed tool (UDT) which is a functional carrier of the requested application(s) group with information such as the user groups and the users in each group which the business manager submitted and got approved by the information owners (also 201 as shown in FIG. 2), and submits requests to the institution's system for creating new records for the requested applications in the Emergency ID Request System (EIDRS). The application access control system administrator is a person who, via a software program called "EAST Admin Tool", joins all nominated application administrators (also referred to the "EAST UDT Administrator") to a privilege group called "EAST-UDT-ADMINISTRATOR" (as shown in FIG. 3), and delegates administration of the applications to each of these nominated application administrators and business coordinators (as shown in FIG. 4). The application administrators are persons who upload the namespaces (access control matrices) for the user developed tools (UDTs) (as shown in FIG. 5), assign "APPID-COORDINATOR" group as a user administration group (as shown in FIG. 6), join all nominated business coordinators to a privilege group called "APPID-COORDINATOR" (as shown in FIG. 7), obtain application seed value from the IT support and set it to a lockbox called "AppSeed" (as shown in FIG. 8), set a random value to a lockbox called "BREAKGLASSPWD" and the corresponding EIDRS record of the applications, and assign business users to the user groups (also 202 as shown in FIG. 2). The business coordinators are nominated end-users who are responsible to manage the security control of UDTs for their own business group. They, via a software program called "EAST UDT Security Toolkit", register the UDTs and assign user group access to these UDT, and create a break glass record corresponding to each installed UDT to the break glass database which is placed in an appropriate location in the shared drive. The break-glass database is a database that is housed local to the protected application that holds the encrypted password to the application. It can be decrypted by use of a software program "Break Glass Tool" and a break-glass password. This is used in case of an emergency when the user would be able to "Break Glass" and unlock the application if the network is down to authenticate user credentials or the Application Access Control system is unavailable. The business users are application users who can also help to verify the setup of the UDT protection.

It should be understood that the business coordinator is an ordinary end-user who is selected to take care of the control of these UDTs. No technical background is required. He/she can use an user-friendly security toolkit to register these UDTs and pick the authorized user group from the list.

It should also be understood that the UDTs are grouped by lines of business. In each line of business, the UDTs can be further sub-grouped by different departments or different information owners. Each of the UDT groups is registered under an application with a separated application record.

Figure 9:
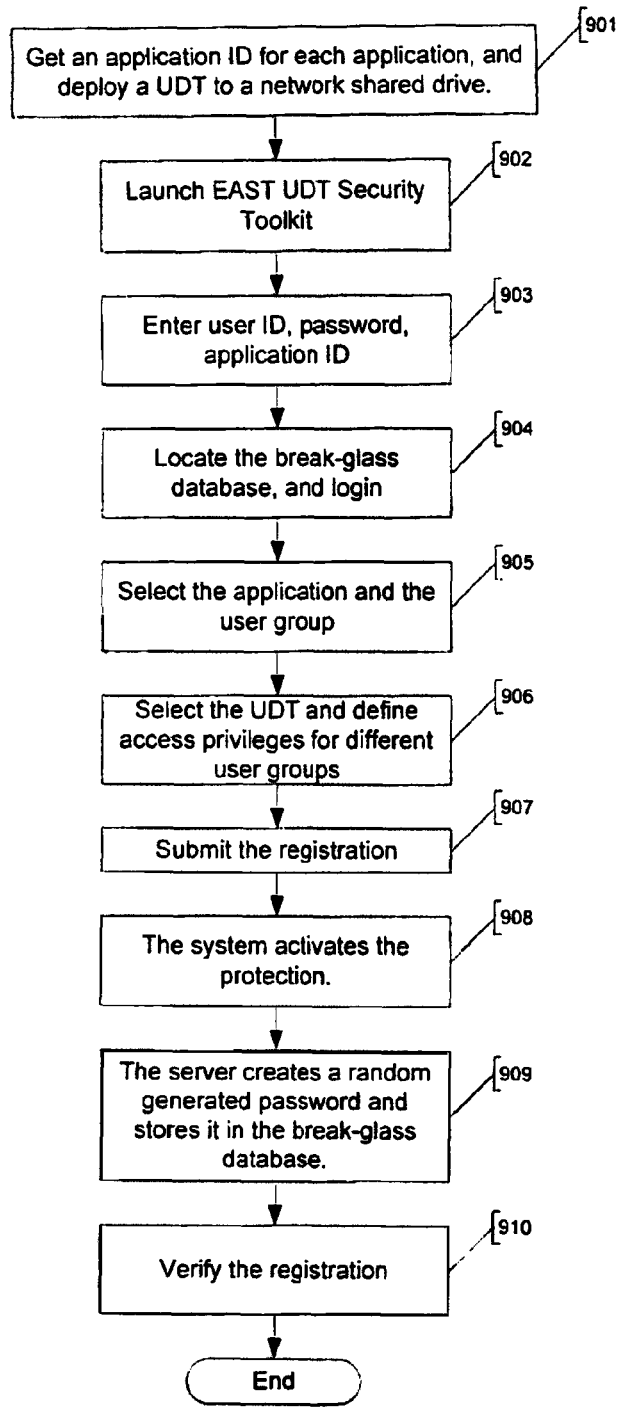
FIG. 9 is a flowchart showing how to register a secured user developed tool (UDT) in accordance with one embodiment of the present invention.
Figure 10:
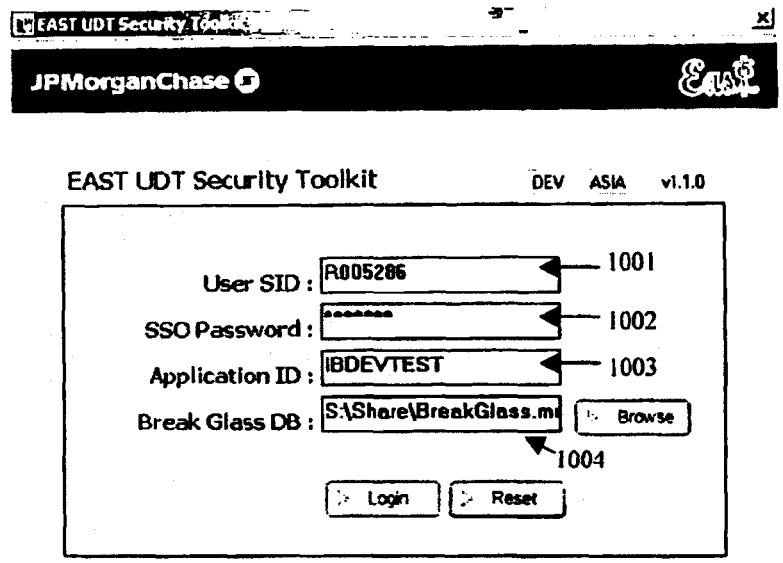
FIG. 10 is a diagram illustrating how to login the EAST UDT Security Toolkit in accordance with one embodiment of the present invention.
Figure 11:
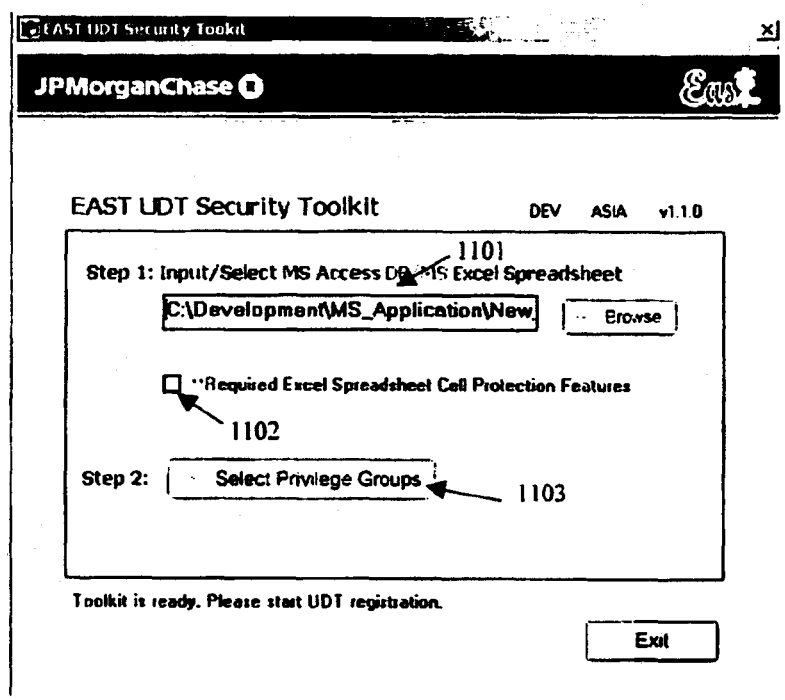
FIG. 11 is a diagram illustrating the continued steps during login the EAST UDT Security Toolkit in accordance with one embodiment of the present invention.
Figures 12, 13:
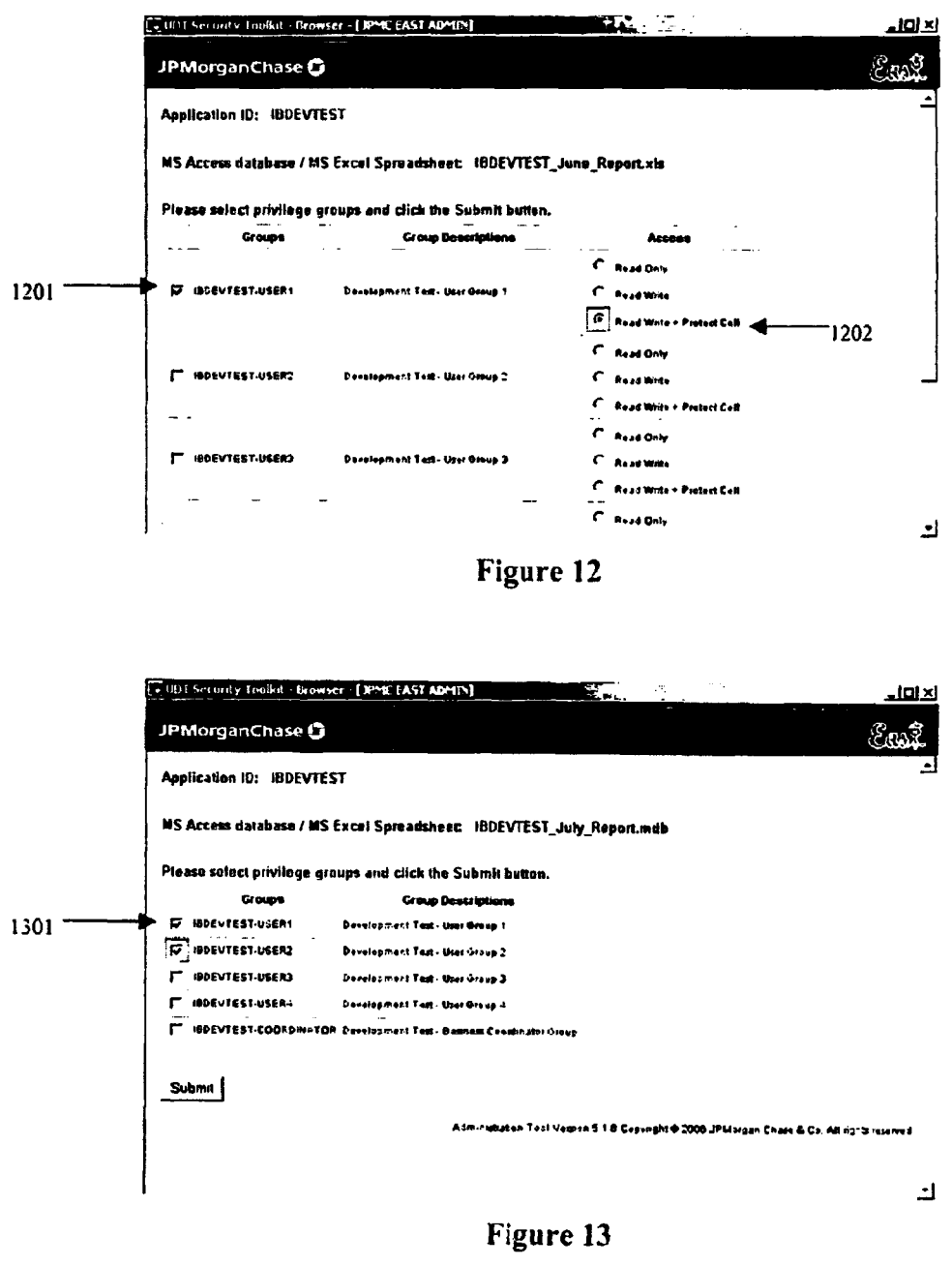

To access some applications protected by the Application Access Control System, it is required to register with the system first by a business coordinator via a software program called "EAST UDT Security Toolkit" so that a UDT containing the applications is protected. FIG. 9 is a flowchart showing how to register a UDT in accordance with one embodiment of the present invention. FIG. 10 is a diagram illustrating how to login the EAST UDT Security Toolkit in accordance with one embodiment of the present invention. FIG. 11 is a diagram illustrating the continued steps after login the EAST UDT Security Toolkit to pick a UDT for registration, in accordance with one embodiment of the present invention. FIG. 12 is a diagram illustrating how to select access levels for a MS Excel UDT in accordance with one embodiment of the present invention. FIG. 13 is a diagram illustrating how to select access levels for MS Access UDT in accordance with one embodiment of the present invention. The process of FIG. 9 is described in connection with FIGS. 10-13 in order to set forth the process in a concrete fashion easily understood by the person of ordinary skills. However, this articulation of the process is exemplary only, and the process could be implemented different from those of FIG. 10-13.

As set forth in FIG. 9, before registration. the business coordinator needs to get an application ID for each access-required application and deploy a UDT to a protected network shared drive 901. He double clicks the icon of EAST UDT Security Toolkit 902. After launching the EAST UDT Security Toolkit, he enters his user ID. his single sign-on password which is a password used to log into the computer system for general purpose, the application ID (e.g. PCSUDT) 903 (also 1001, 1002, and 1003 respectively as shown in FIG. 10). Then he locates the break-glass database housing the encrypted passwords for the UDT to be registered 904 (also 1004 as shown in FIG. 10). After successful login, he selects the access-required application and the user group he belongs to 905 (also 1101 and 1102 respectively as shown in FIG. 11). He then selects the UDT from a network shared drive and defines access privileges (Read/Write) for different user groups 906. For MS Excel UDT, the business coordinator can select different user groups who are allowed to use the spreadsheet with "Read Only" or "Read Write" option (as shown in FIG. 12). For MS Access UDT, the business coordinator can select different user groups who are allowed to use this spreadsheet with "Read Write" option (as shown in FIG. 13). The available privileges options (e.g. "Read Only" and "Read Write") locked or granted by the UDT are based on the application being protected. After the "Submit" button is pressed, if the protection has been set successfully, a message box "Set Password Successfully" appears 907. The business coordinator then presses OK to close the Toolkit. It may take the system a few minutes to activate the protection 908. During this period, the application access control server creates and encrypts a random generated password for the access-required application, and stores the password in its back-end centralized database as well as the local break-glass database corresponding to the registered UDT and thus protects the UDT and the application 909. After the business coordinator registers a UDT. he/she should work with a business user who is entitled to use this UDT to verify the break-glass database setup and the protection setup to that UDT 910.

Figure 14A:
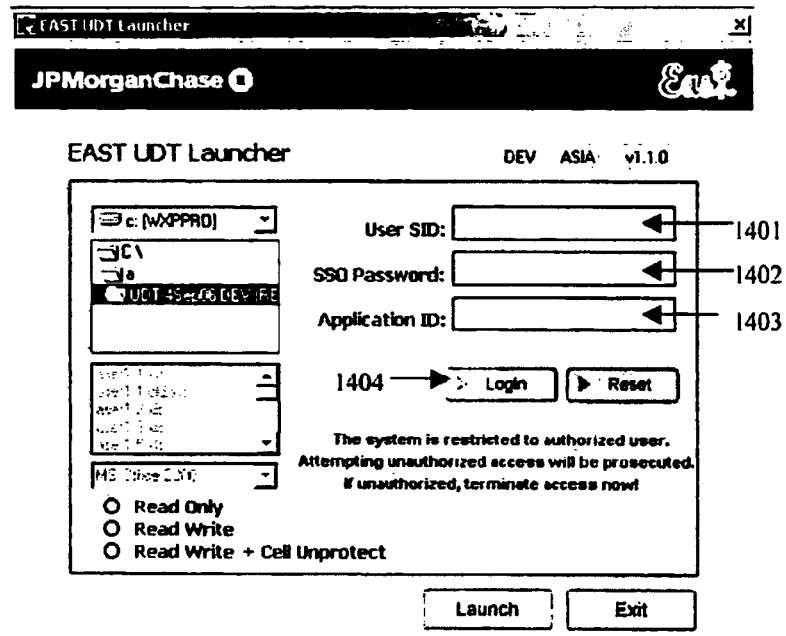
FIGS. 14A-B are diagrams illustrating how to access a protected application via the EAST UDT launcher in accordance with one embodiment of the present invention.
Figure 14B:
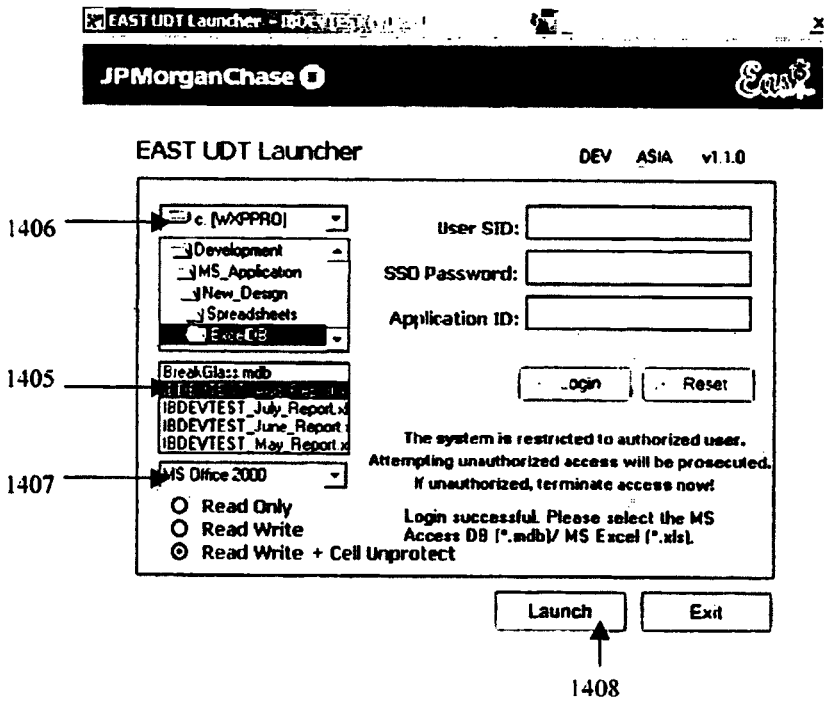

Once a registration of a UDT containing an access-required application is carried out by a business coordinator. an entitled business user can access the UDT and the application. FIGS. 14A-B are diagrams illustrating how to access a protected application via a EAST UDT launcher which is a software program used to access the protected application in accordance with one embodiment of the present invention. The business user first double clicks the icon of the EAST UDT Launcher. As set forth in FIG. 14A, after the EAST UDT Launcher opens, he/she enters his user ID 1401, his single sign-on password 1402, the access-required application ID (e.g., PCSUDT) 1403, and press "Login" button 1404. After verified the password by the application authentication facility. The application access control server will check with its record whether the user is authorized to access the requested application. If yes. as set forth in FIG. 14B. the option box in bottom left corner will be enabled 1405. The user can select the access-required UDT 1406 and its corresponding break-glass database 1405 for launching the application. For Excel UDT, the user can select "Read Only" or "Read Write" option For Access UDT. the user can select "Read Write Option". Finally, the user press "Launch" button to open that UDT 1408. The system then requests the encrypted password from the application access control server and uses the encrypted password to launch the protected application.

Figure 15:
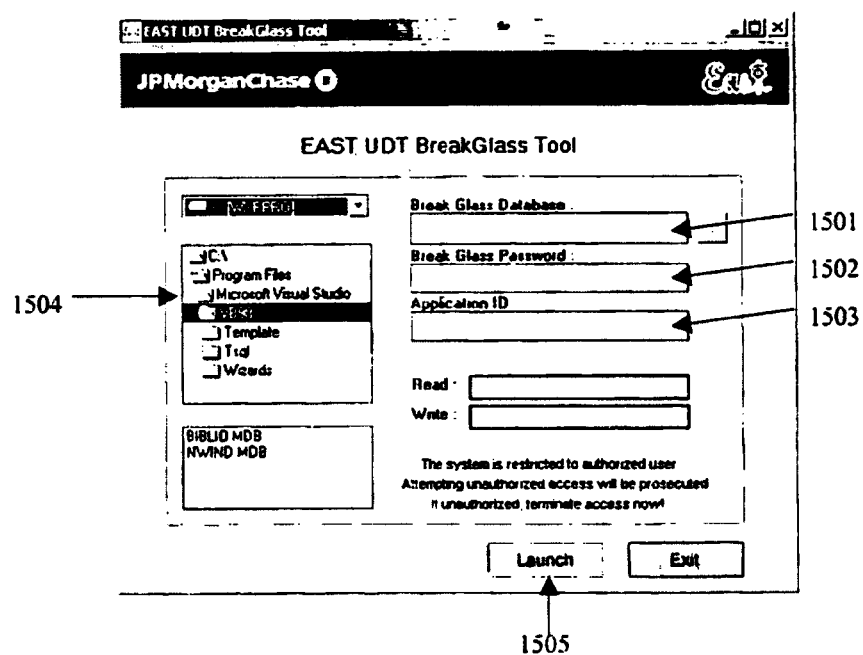
FIG. 15 is a diagram illustrating how to use the EAST UDT Break-Glass Tool to launch an application under an emergency in accordance with one embodiment of the present invention.

For an emergency, e.g. when the application access authentication facility is un-reachable and the user logins cannot be validated, an authorized user can use a software program called EAST UDT Break-Glass Tool to retrieve the clear-text password for a particular UDT. He/she can then open the required application directly with this clear-text password instead of using the EAST UDT Launcher. Under such circumstances, after the break-glass period is over, a new random password will be generated by the server and placed under the break-glass database. The prerequisites for the user who can carry out this process are that he/she can access the break-glass database in the shared drive, and he/she is authorized to retrieve the break-glass password from EIDRS. FIG. 15 is a diagram illustrating how to use the EAST UDT Break-Glass Tool to launch an application under an emergency in accordance with one embodiment of the present invention. The authorized user first starts the EAST UDT Break-glass Tool. He/she then selects the pre-set break-glass database from the shared drive 1501, enters the break-glass password which he obtained from the EIDRS earlier 1502, enters the application ID 1503, selects an UDT tool for break-glass 1504, and finally clicks "Login" 1505. The clear-text password will be shown. Then, he/she can use this password to launch the application.

Although an illustrative embodiment of the present invention, and various modification thereof, have been described in detail herein with reference to the accompanying figures, it is to be understood that the invention is not limited to this precise embodiment and the described modifications, and that various changes and further modifications may be effected therein by one skilled in the art without departing from the scope or spirit of the invention as defined in the claims.

The invention claimed is:

1. A method for controlling a user's access rights to protected and access-required application in a computer system, comprising:
   (a) registering a user developed tool housing the protected and access-required application with the computer system to activate protection on the user developed tool and the protected and access-required application housed within the user developed tool via a software program;
   (b) creating a randomly-generated and encrypted password in a configured mechanism for the protected and access-required application, and storing the randomly-generated and encrypted password in a break-glass database and a back-end database corresponding to the registered user developed tool by an application access control server;
   (c) entering the user's identification, the single sign-on password, and identification of the protected and access-required application in a user developed tool launcher, to login with a centralized application access authentication facility;
   (d) checking whether the user is authorized to access the protected and access-required application by the application access control server; and
   (e) retrieving the randomly-generated and encrypted password from the back-end database and decrypting the randomly-generated and encrypted password to use the decrypted randomly-generated password to launch the application by the application access control server if confirmed that the user is authorized to access the protected and access-required application.

2. The method of claim 1, further comprising:
   (f) verifying whether the user developed tool is properly registered and thus protected.

3. The method of claim 1, wherein the protected and access-required application comprises databases, software, documents, or presentation materials.

4. The method of claim 1, wherein the user developed tool is a functional carrier of the protected and access-required application grouped in a network shared drive, and grouped by lines of business, departments, or application owners.

5. The method of claim 1, wherein the break glass database is a database containing the randomly-generated and encrypted passwords corresponding to the protected and access-required, application in the user developed tool, and is housed local to the user developed tool.

6. The method of claim 1, wherein the single sign-on password is a centralized managed password used for logging into the computer system for general purpose.

7. The method of claim 1, wherein the centralized, application access authentication facility comprises an engine controlling and implementing an access authentication process.

8. A method for controlling a user's access rights to protected and access-required applications in a computer system, comprising:

registering the protected and access-required application with the computer system to activate protection on the protected and access-required application via a software program;

creating a randomly-generated and encrypted password in a configured mechanism for the protected and access-required application, and storing the randomly-generated and encrypted password in a break-glass database and a back-end database corresponding to the registered user developed tool by an application access control server;

entering the user's identification, the single sign-on password, and identification of the protected and access-required application in an access launcher, to login to an application access authentication facility;

checking whether the user is authorized to access the protected and access-required application by the application access control server; and retrieving the randomly-generated and encrypted password, decrypting the randomly-generated and encrypted password and use the decrypted randomly-generated password to launch the protected and access-required application by the application access authentication facility if confirmed that the user is authorized to access the protected application.

9. The method of claim 8, wherein the protected and access-required application comprises databases, software, documents, or presentation material.

10. The method of claim 8, wherein the single sign-on password is a centralized managed password used for logging into the computer system for general purpose.

11. The method of claim 8, wherein the application access authentication facility comprises an engine controlling and implementing an access authentication process.

12. A computer security system for controlling a user's access rights to protected and access-required applications in a computer system whenever the user accesses the protected and access-required applications and thus ensuring that the protected and access-required applications are accessed by authorized users, comprising:

a computer server, comprising a processor and memory, for controlling and implementing an authentication process for a user to access the protected and access-required applications;

a first module for randomly generating and encrypting passwords for the protected and access-required applications in configured mechanisms;

user developed tools for housing the protected and access-required applications in a network shared drive;

break-glass databases for housing the randomly-generated and encrypted passwords corresponding to the protected and access-required applications in the user developed tools;

back-end databases for housing the randomly-generated and encrypted passwords;

a second module for registering the user developed tools housing the protected and access-required applications to activate protection on the user developed tools and the protected and access-required applications; and a third module for accessing the protected and access-required applications via authenticating whether a user is authorized to access the protected and access-required applications, retrieving the encrypted passwords from the break-glass databases, decrypting the encrypted passwords, and using the decrypted passwords to launch the protected and access-required applications.

* * * * *